(12) United States Patent
Kobrosly et al.

(10) Patent No.: US 7,139,379 B2
(45) Date of Patent: Nov. 21, 2006

(54) MONITORING TELEPHONE CONFERENCES THROUGH A NETWORK OF COMPUTER CONTROLLED DISPLAY TERMINALS, EACH ASSOCIATED WITH A TELEPHONE STATION AND DISPLAYING A USER-INTERACTIVE MONITORING PAGE

(75) Inventors: Walid M. Kobrosly, Round Rock, TX (US); Nadeem Malik, Austin, TX (US); Marques Benjamin Quiller, Pflugerville, TX (US); Avijit Saha, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 10/464,887

(22) Filed: Jun. 19, 2003

(65) Prior Publication Data

US 2004/0258222 A1 Dec. 23, 2004

(51) Int. Cl.
*H04M 3/42* (2006.01)

(52) U.S. Cl. .............................. 379/202.01; 379/93.21; 370/260; 709/204

(58) Field of Classification Search ............. 379/93.17, 379/93.21, 202.01, 203.01; 370/260, 261, 370/262; 709/204
See application file for complete search history.

(56) References Cited

U.S. PATENT DOCUMENTS

| | | | | |
|---|---|---|---|---|
| 5,195,086 A | * | 3/1993 | Baumgartner et al. | 370/264 |
| 5,625,410 A | * | 4/1997 | Washino et al. | 348/154 |
| 5,710,591 A | * | 1/1998 | Bruno et al. | 348/14.09 |
| 5,754,636 A | * | 5/1998 | Bayless et al. | 379/142.1 |
| 5,963,913 A | * | 10/1999 | Henneuse et al. | 705/9 |
| 6,178,237 B1 | * | 1/2001 | Horn | 379/202.01 |
| 6,304,648 B1 | * | 10/2001 | Chang | 379/202.01 |
| 6,418,214 B1 | * | 7/2002 | Smythe et al. | 379/202.01 |

* cited by examiner

*Primary Examiner*—Bing Q. Bui
(74) *Attorney, Agent, or Firm*—J. B. Kraft; Mark E. McBurney (57) ABSTRACT

Monitoring of any conventional telephone conference in which a requisite set of conference attendees respectively at a corresponding set of telephone stations are connected into a telephone conference. In association with the telephone conference, a communication network with user access via a plurality of data processor controlled interactive display stations for displaying received network documents available from sources on the network in which there is an interactive display station associated with each of said set of telephone stations with a displayed document including an indicator representing each attendee having means for indicating whether the attendee's telephone station is connected into the conference, and means for indicating whether the attendee is speaking. During telephone conference initiation, there is placed on-call each telephone station initially connecting into the conference and there is an implementation for calling said on-call telephone stations into the conference when a quorum of said requisite attendees has connected into the conference.

21 Claims, 8 Drawing Sheets

MONITORING TELEPHONE CONFERENCES THROUGH A NETWORK OF COMPUTER CONTROLLED DISPLAY TERMINALS, EACH ASSOCIATED WITH A TELEPHONE STATION AND DISPLAYING A USER-INTERACTIVE MONITORING PAGE

TECHNICAL FIELD

The present invention relates to computer managed communication networks of interactive display stations, such as the World Wide Web (Web) or like private networks, and particularly to applications of such networks for user interactive monitoring of telephone conferencing.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents. The Web or Internet, which had quietly existed for over a generation as a loose academic and government data distribution facility, reached "critical mass" and commenced a period of phenomenal expansion. With this expansion, businesses and consumers have direct access to all matter of documents and media through the Web.

Also, because of this extensive access of businesses and consumers to the Internet or Web (used interchangeably herein), it is highly likely that anyone who might be asked to participate in a telephone conference would also have access to the Web. Such demographics has led the industry to seek applications in which the Web could be used in telephone conferencing. The present invention considers one such potential application.

The use of telephone conferencing in commerce and industry has undergone some changes that were not anticipated a decade ago. At that time, the trend appeared to be toward teleconferencing between sets of high technology studios each with groups of people and closed circuit television therebetween. While some of these set ups are still quite active, the business world appears to have moved back to a more basic and less expensive telephone conferencing in which individuals and remote telephone stations, each with either single attendees or conferees or groups of people over speaker phones participate in the telephone conference. This rather basic telephone conferencing has been proliferating world-wide driven by the economic and terrorist fear curtailment of travel.

While this form of telephone conferencing has been used quite effectively to save time and money, participants, i.e. conference attendees, have encountered some problems. First, during the initiation of the telephone conference, time is wasted as the participants connect on one by one until the quorum of requisite attendees is connected. Then, when several people are talking over the lines during the same time period, it is hard for each attendee to know who is who. Likewise, it is hard for the conference host or any other interested party to know when a required attendee has disconnected.

SUMMARY OF THE PRESENT INVENTION

The present invention provides a system for monitoring such teleconferencing that reduces the above-mentioned problems. The invention is directed to the monitoring of any conventional telephone conference in which a requisite set of conference attendees respectively at a corresponding set of telephone stations are connected into a telephone conference. The invention provides in association with the telephone conference, a communication network with user access via a plurality of data processor controlled interactive display stations for displaying received network documents available from sources on the network in which there is an interactive display station associated with each of said set of telephone stations with a displayed document including an indicator representing each attendee having means for indicating whether the attendee's telephone station is connected into the conference, and means for indicating whether the attendee is speaking.

The present invention also provides some valuable expedients for initiating such telephone conferences involving the combination of means (during the initiation period) for placing on-call each telephone station initially connecting into the conference, and means for calling these on-call telephone stations into the conference when a quorum of said requisite attendees has connected into the conference. This initiation process may be automated through means for determining when the quorum of required attendees has connected into the conference, and rendering the means for calling the on-call telephone stations automatically responsive to the means for determining when said quorum has connected.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
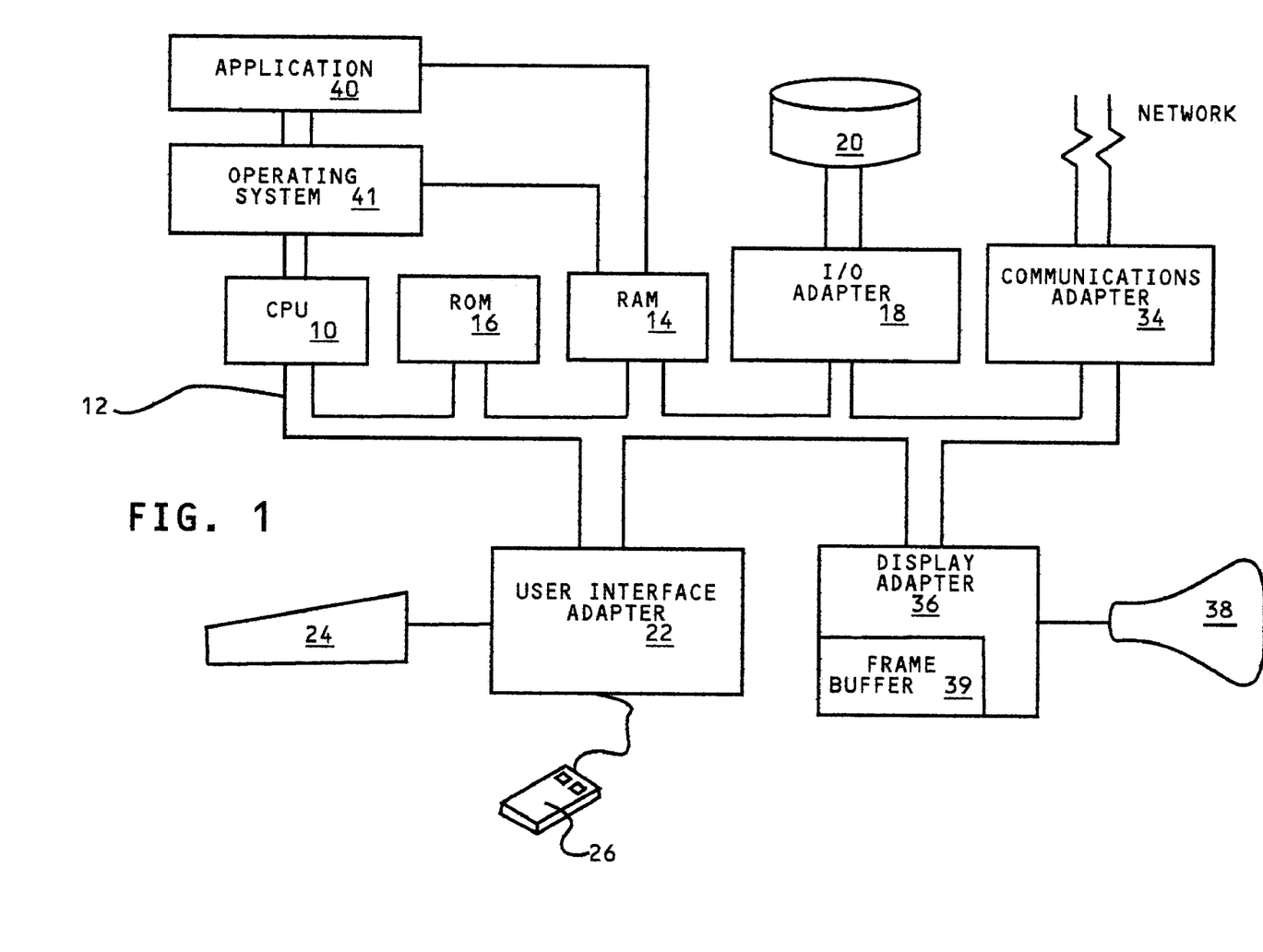
FIG. 1 is a block diagram of a data processing system including a central processing unit and network connections via a communications adapter that is capable of implementing the interactive display terminals, as well as servers in the network, e.g. Web distribution of the display panels supporting the telephone stations in the conferences.

Referring to FIG. 1, a typical data processing system is shown that may function as the computer controlled network terminals or Web stations used for the display of the screen pages or panels supporting the telephone conference. The system shown is also illustrative of any of the server computers used for the Web page or panel distribution to be described in greater detail with respect to FIG. 2.

A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows XP™ or Windows2000™, as well as UNIX and AIX operating systems. Application programs 40, controlled by the system, are moved into and out of the main memory Random Access Memory (RAM) 14. These programs include the programs of the present invention for the monitoring of telephone conferences on display station screen panels ancillary to and supportive of associated telephone stations connected in the telephone conference.

In the examples to be described, we will use the Web for the distribution of the monitoring display panels at the Web stations. Any conventional Web browser application program, such as Microsoft's Internet Explorer™, or Lotus Notes™ Personal Web Navigator or Server Web Navigator will be available for distributing the monitoring Web pages or panels to the network stations associated with the telephone conference stations. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since an aspect of the present invention is directed to documents such as screen panels transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to the lower level objects in the hierarchy through a variety of network server computers. E-mail is distributed through such a network.

Figure 2:
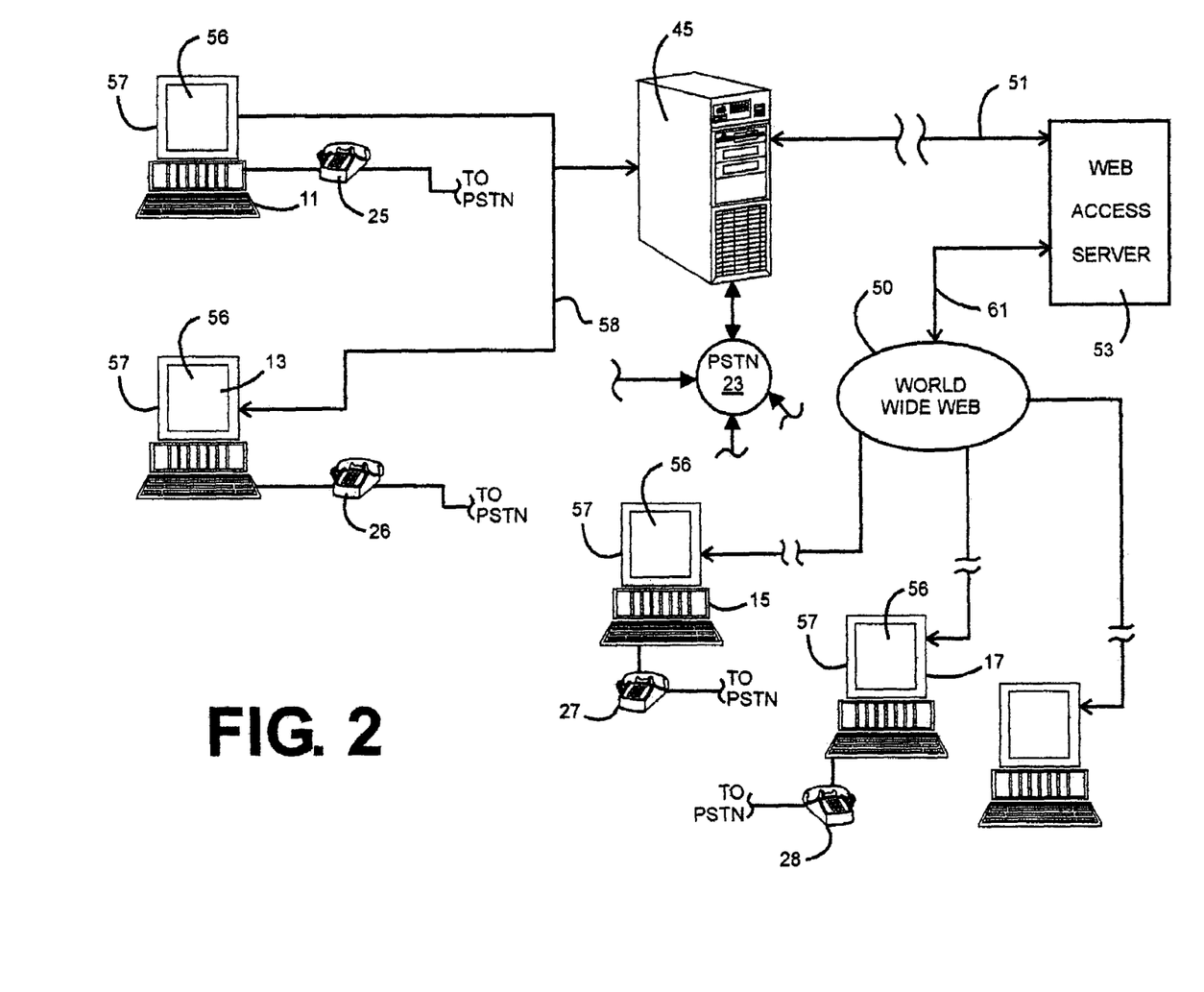
FIG. 2 is a generalized view of an illustrative system in which a Web network display panel distribution may be used in the support of a telephone conference according to the practice of the present invention.

A generalized diagram of a portion of the Web for illustration of the telephone conferencing and monitoring system of the present invention is shown in FIG. 2. The telephone conference may be a conventional teleconference set up with a plurality of remote telephone stations 25, 26, 27 and 28 through which the invited conference attendees call-in or are called-in and are interconnected through standard Public Switched Telephone Networks (PSTNs) 23 in a standard manner. The telephone stations may be conventionally wired into the conference through the PSTNs or the stations may be wireless cellular telephone stations connected into the PSTN through conventional wireless cellular networks. Each telephone station 25–28 has an associated Web network terminal 11, 13, 15 and 17 with displays 57 upon which the screen panels 56 may be displayed. Terminals 11, 13, 15 and 17 may be implemented by the computer system setup in FIG. 1, and connection 58 (FIG. 2) is the network connection shown in FIG. 1. For purposes of the present embodiment, terminals 11, 13, 15 and 17 are representative of the Web display stations for respectively supporting and monitoring telephone stations 25–28 to be described with respect to FIGS. 3 through 6. Reference may be made to the above-mentioned, *Mastering the Internet*, pp. 136–147, for typical connections between local display stations to the Web via network servers; any of which may be used to implement the system on which this invention is used. In the typical set up shown, terminals are connected via, let us say, host dial connections (not shown) to server 45 provided by a Web Service Provider or the private network service provider that in turn accesses the Web 50 via connection 51 to a Web access server 53 and connection 61. In addition to the above-described standard dial-in or dial-out in the establishment of telephone conferencing, the Web or like browser program may be modified with application programs that will dial telephone stations. The possibility of such an alternate dialing is indicated in the lines connecting telephone stations 25–28 to their associated network terminals in addition to the lines connecting these telephone stations to the PSTN 23.

Figure 3:
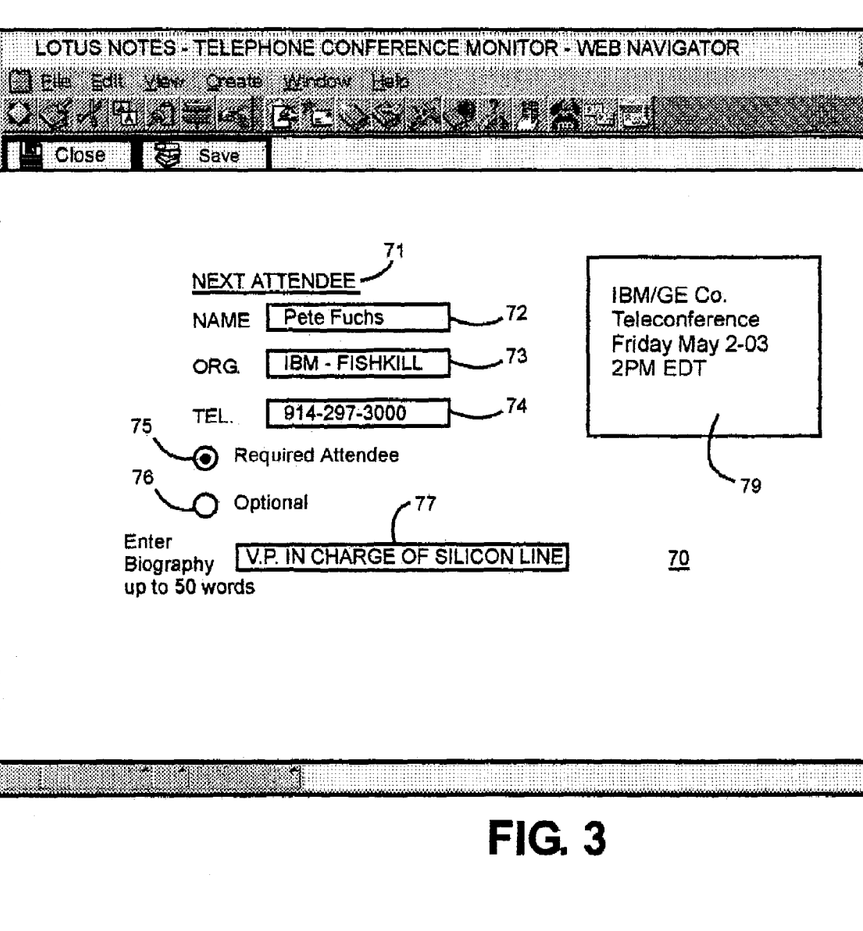
FIG. 3 is a diagrammatic illustration of an interactive display interface panel used by the conference host in the setting up of the ancillary Web station display panels supporting the telephone conference at the display station of each attendee.
Figure 4:
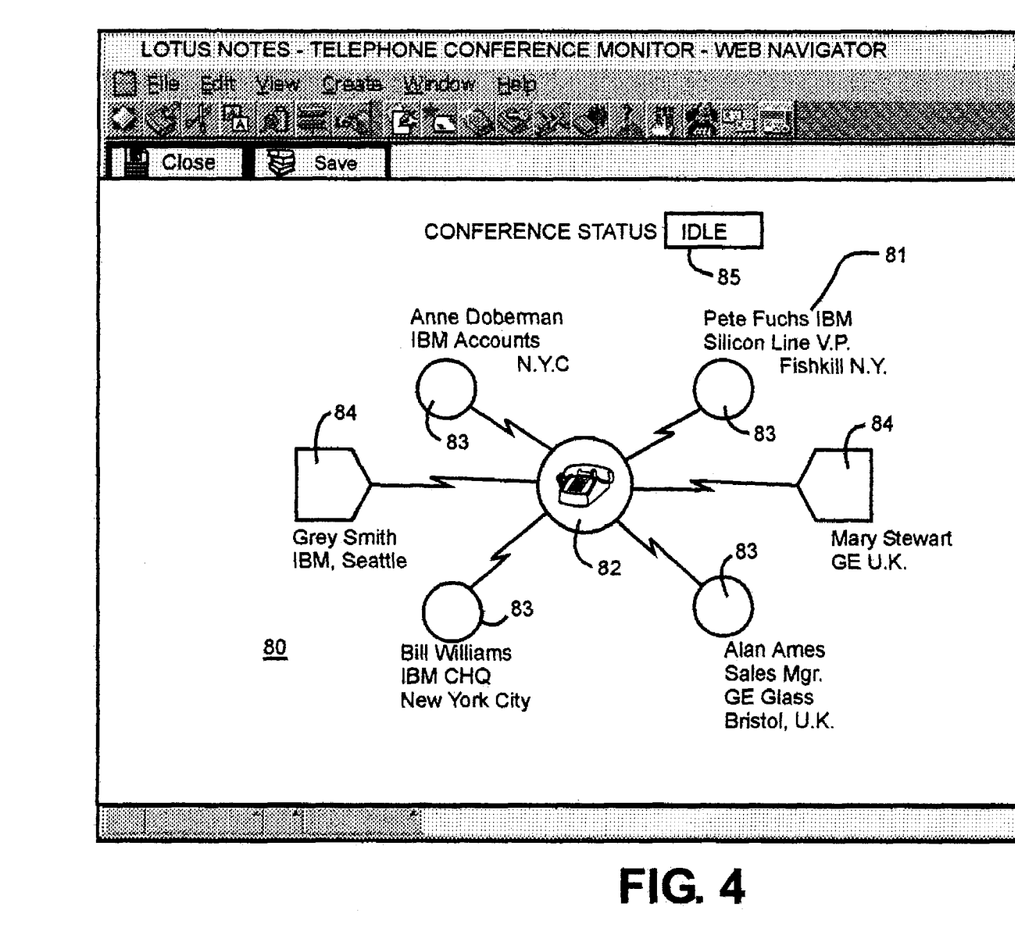
FIG. 4 is an illustrative example of an interactive display panel distributed to each teleconference at the initial stage when the conference is still idle.

With this Web network distributed monitoring set, there will now be described an embodiment for monitoring telephone conferences using the distributed Web page set up and monitoring panels of FIGS. 3 through 6. The host who is setting up the teleconference uses the dialog panel of FIG. 3 to submit a profile of each attendee. At this point, we assume that the host has already cleared meeting times and scheduling with these attendees using conventional conference techniques such as those used in Lotus Notes, Version 6, Meetings and Conferencing. These procedures are not part of this invention that deals with the provision of monitoring panels. Thus, when the host is making entries on the set up dialog panel 70 of FIG. 3, the subject and time of the meeting 79 has already been set. For each attendee 71, the host enters the name 72, the organization 73, the telephone number 74 and whether the attendee is required 75 or optional 76. The host is also prompted to enter a short biography 77 of the attendee. This information is stored at the host's display station or its associated network server. From this information, there is generated a Web page or panel 80, FIG. 4, that is distributed over the Web to all attendees for the conference at the time that dial in for the conference has been scheduled. The status shown in FIG. 4 is the Idle mode 85 wherein call-ins on the telephone stations have not yet commenced. Panel 80 has a set of circular icons 83 representing each required attendee and pentagonal icons 84 representing optional attendees. For each invited attendee, there is given the name 81, as well a brief descriptive or biographical text. The conference itself is represented by icon 82.

Figure 5:
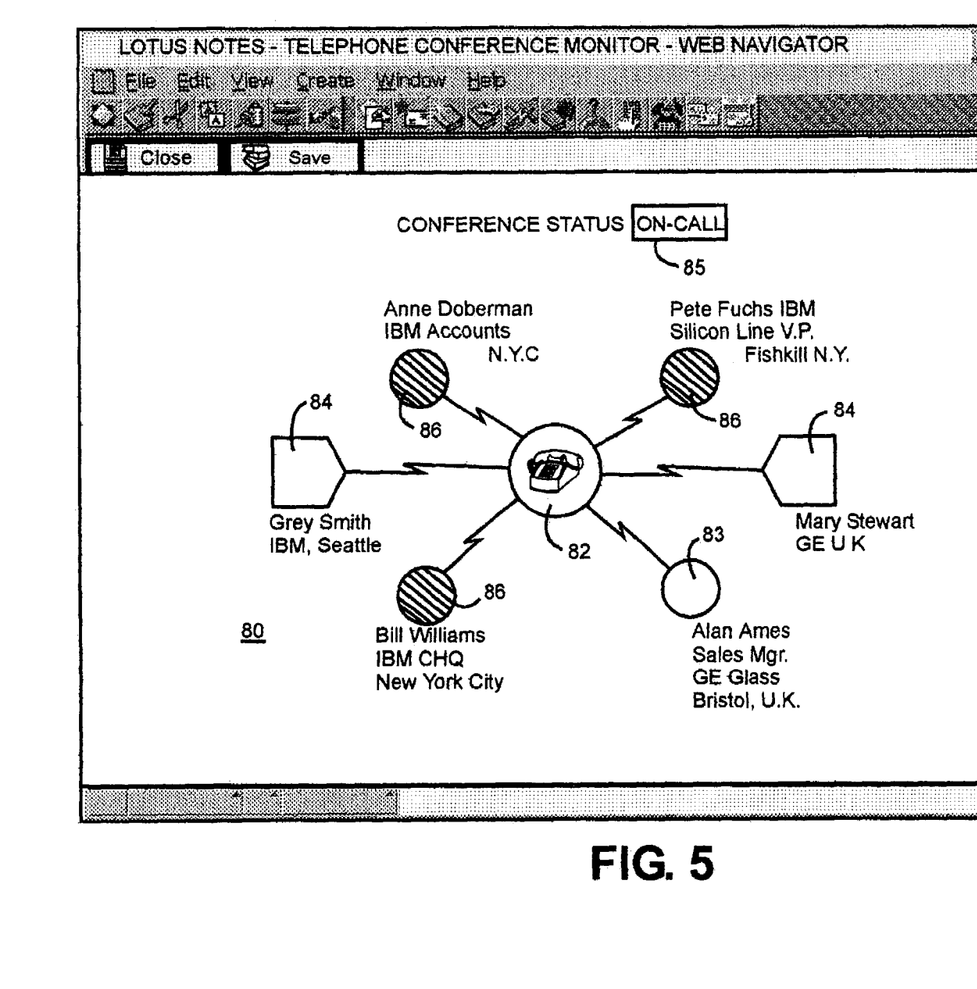
FIG. 5 is a display interface panel like that of FIG. 4 but after the teleconference has been commenced (initiation stage), and attendees are being connected and placed on call.

As the attendees begin to dial into the teleconference as shown in FIG. 5, the connection of the attendee into the conference is indicated by a highlighting 86, e.g. a lighting up or brightening of the icon representing the attendee. Also, during the initial call-in period, if all of the required attendees have not as yet called in, then the indicated conference status 85 changes to On-hold wherein the connected attendees need not wait on the line at the telephone. Rather, when the last required attendee calls in and is connected to complete the conference, then the telephones of all the on-hold attendees ring and the conference commences. This may be done automatically.

Figure 6:
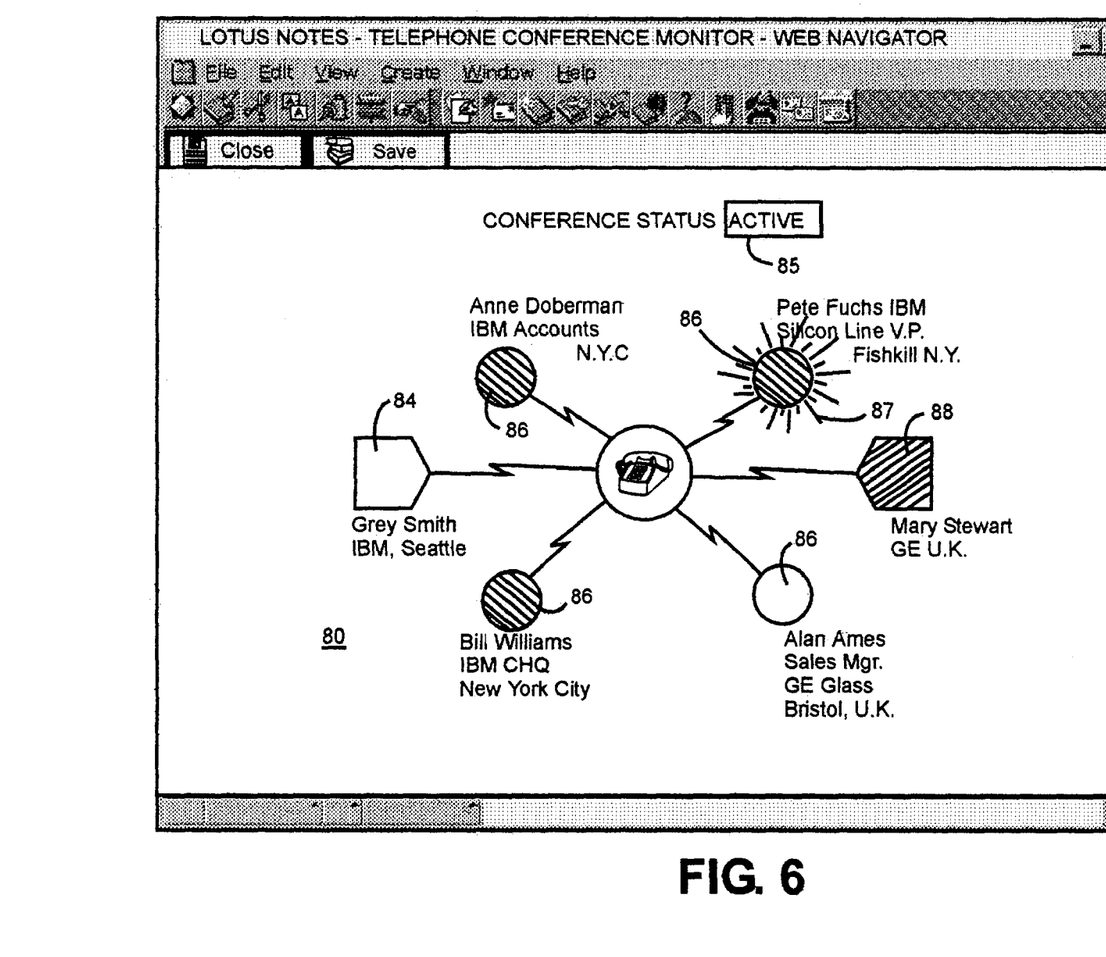
FIG. 6 is a display interface panel like that of FIG. 5 but after the active teleconference has been commenced, and the attendees are speaking to each other.

In FIG. 6, the initiation of the conference is over; the status 85 is Active and the four required attendees are connected 86. One of the optional attendees is connected 88. As an aid to the attendees, when an attendee is speaking, his connected icon 86 flashes or pulses 87. If any attendee disconnects during the conference, his icon will return to its initial unhighlighted state 83 (FIG. 3).

Figure 7:
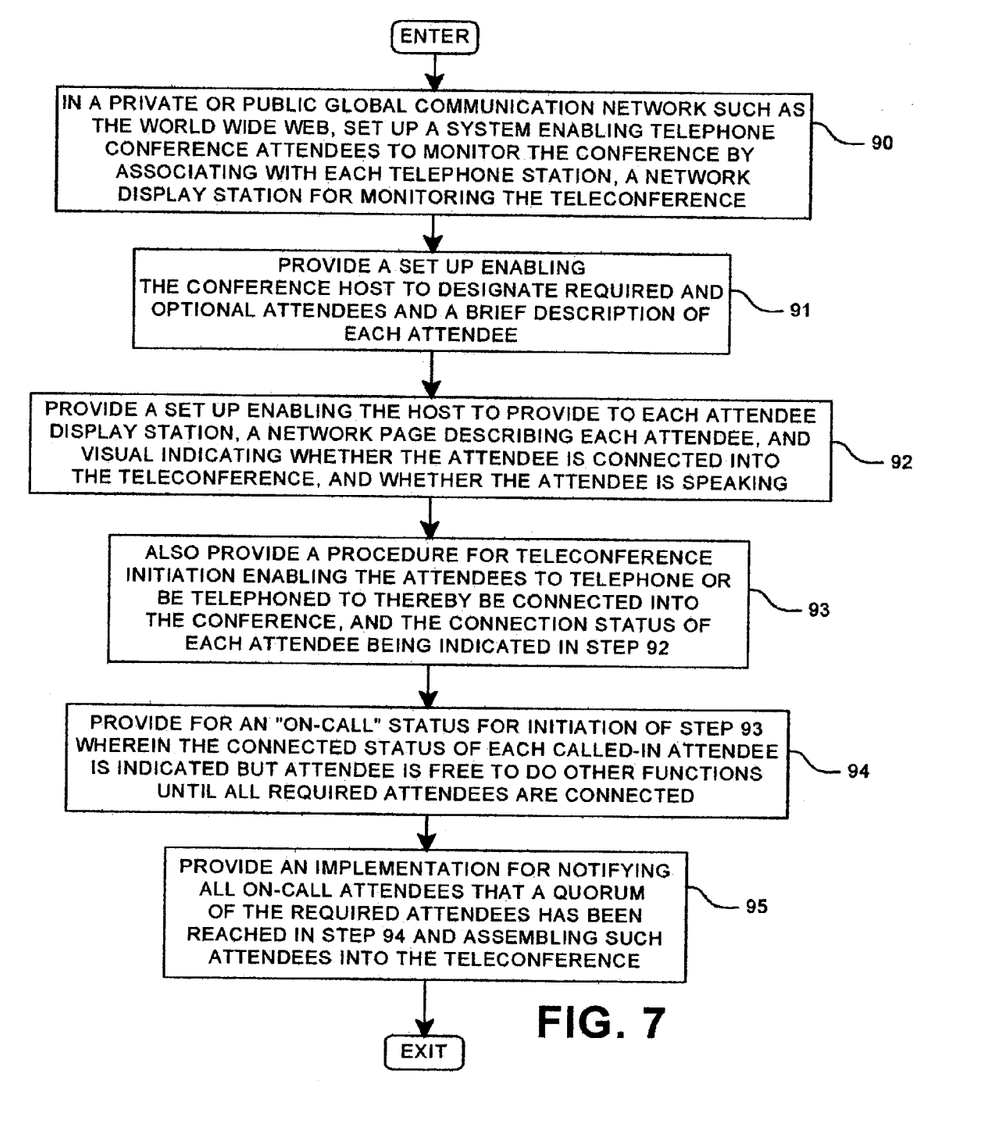
FIG. 7 is an illustrative flowchart describing the setting up of the functions to monitor telephone conferences on supporting network display panels according to the present invention.

FIG. 7 is a flowchart showing the development of a process according to the present invention for enabling telephone conference attendees to monitor such conferences over screen panels distributed to them over a communication network. In a private or public communication network, such as the Web, there is set up a system enabling the teleconference attendees to monitor by associating with each telephone station in the conference, a corresponding network display station for monitoring the teleconference, step 90. The conference host is provided with a set up panel enabling him to designate optional and required attendees and provide a brief description of each attendee, step 91. There is set up a process enabling the host to provide to each telephone conference attendee, a network, e.g. Web page describing each attendee, visually indicating whether the attendee is connected into the teleconference and whether the attendee is speaking, step 92. A procedure is provided for teleconference initiation that enables the attendees to telephone conventionally into the conference and thereby be connected. The connection status of each attendee, according to step 92, is indicated, step 93. During the initiation period of step 93, there is provided an on-call status wherein the connection status of each called-in and connected attendee is indicated but the attendee is free to do other functions until all required attendees are connected, step 94. Finally, an implementation is provided for notifying all on-call attendees that a quorum of the required attendees has been reached in step 94 and for assembling all such attendees into the teleconference, step 95.

Figure 8:
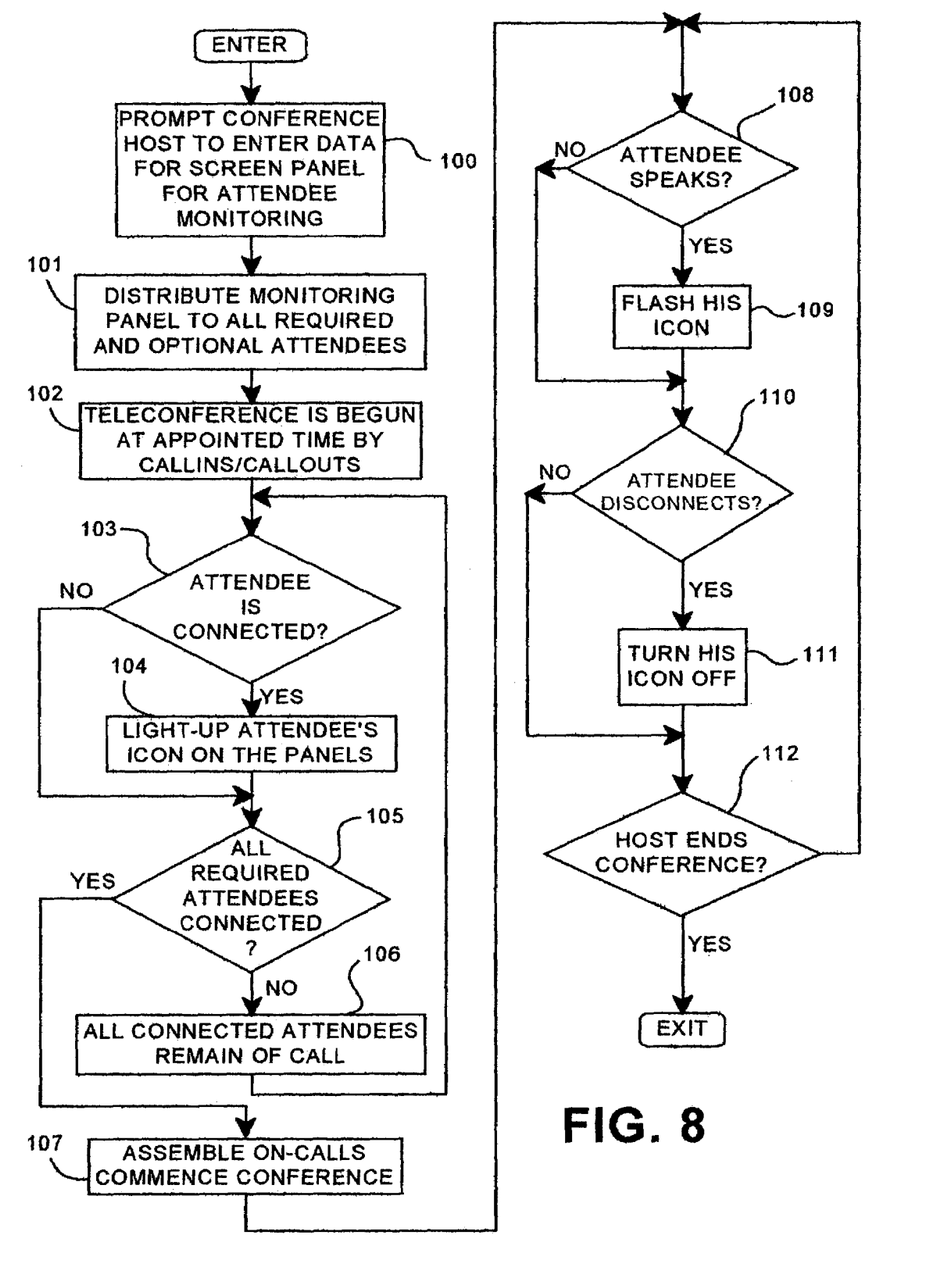
FIG. 8 is a flowchart of an illustrative run of the program set up according to FIG. 7.

A simplified run of the process set up in FIG. 7 and described in connection with FIGS. 3 through 6 will now be described with respect to the flowchart of FIG. 8. The conference host is prompted and enters the data regarding attendees that is required to create the attendee monitoring screen panels, step 100. The panels generated by the data entered by the host in step 100 is distributed to all attendees, step 101. At the appointed time, initiation of the conference commences by standard telephone calls, step 102. During conference initiation, a determination is made as to whether an attendee is connected, step 103. If Yes, the attendee's icon on each monitoring panel is lit up, step 104. Then, or if the decision in step 103 is No, a determination is made, step 105, as to whether all required attendees have been connected, step 105. If No, then, step 106, all connected attendees remain on-call and the process is returned to step 103. If Yes in step 105, then the on-calls are assembled and the conference is begun, step 107. During the teleconference, a determination is made as to whether an attendee is speaking, step 108. If Yes, the speaking attendee's icon is flashed. Then, or if No, a determination is made as to whether a particular attendee has disconnected, step 110. If Yes, the attendee's icon is turned off, step 111. Then, or if No, a determination needs to be made as to whether the host has ended the conference, step 112. If Yes, the conference is exited. If No, the process is returned to step 108.

One of the preferred implementations of the present invention is in application program 40 made up of programming steps or instructions resident in RAM 14, FIG. 1, of Web server computers during various Web operations. Until required by the computer system, the program instructions may be stored in another readable medium, e.g. in disk drive 20, or in a removable memory, such as an optical disk for use in a CD ROM computer input, or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a communication network with user access via a plurality of date processor controlled interactive display stations for displaying received network documents available from sources on the network, a system for monitoring telephone conferences comprising:

means enabling a requisite set of conference attendees respectively at a corresponding set of telephone stations to connect into a telephone conference;

an interactive display station associated with each of paid set of telephone stations with a displayed document including:

an indicator representing each attendee having:

means for indicating whether the attendee's telephone station is connected into the conference, and means for indicating whether the attendee is speaking;

means for placing on-call each telephone station initially connecting into the conference; and means for calling said on-call telephone stations into the conference when a quorum of said requisite attendees has connected into the conference.

2. The network system for monitoring telephone conferences of claim 1 wherein said conference initiating means further includes:

means for determining when said quorum has connected into the conference; and wherein said means for calling said on-call telephone stations are automatically responsive to said means for determining when said quorum has connected.

3. The network system for monitoring telephone conferences of claim 1 wherein said means for indicating become highlighted when the attendee's telephone station is connected.

4. The network system for monitoring telephone conferences of claim 3 wherein said means for indicating pulse when the associated attendee is speaking.

5. The network system for monitoring telephone conferences of claim 1 wherein:
said means for indicating whether the attendee's telephone station is connected become highlighted when the attendee's telephone station is connected; and
said means for indicating whether the attendee is speaking pulse when the associated attendee is speaking.

6. The network system for monitoring telephone conferences of claim 1 further including display means for indicating the presence of a quorum.

7. The network system for monitoring telephone conferences of claim 3 further including means associated with each indicator representing an attendee for describing said attendee.

8. In a communication network with user access via a plurality of data processor controlled interactive display stations for displaying received network documents available from sources on the network, a method for monitoring telephone conferences comprising:
enabling a requisite set of conference attendees respectively at a corresponding set of telephone stations to connect into a telephone conference; and
displaying at an interactive display station associated with each of said set of telephone stations, a displayed document including:
an indicator representing each attendee;
an indication as to whether the attendee's telephone station is connected into the conference, and
an indication as to whether the attendee is speaking;
placing on-call each telephone station initially connecting into the conference; and
calling said on-call telephone stations into the conference when a quorum of said requisite attendees has connected into the conference.

9. The method for monitoring telephone conferences of claim 8 wherein said conference initiating process further includes:
determining when said quorum has connected into the conference; and
wherein said means for calling said on-call telephone stations are automatically responsive to said means for determining when said quorum has connected.

10. The method for monitoring telephone conferences of claim 8 wherein said indicator becomes highlighted when the attendee's telephone station is connected.

11. The method for monitoring telephone conferences of claim 10 wherein said indicator is pulsed when the associated attendee is speaking.

12. The method for monitoring telephone conferences of claim 8 wherein:
said indicator becomes highlighted when the attendee's telephone station is connected; and said indicator is pulsed when the associated attendee is speaking.

13. The method for monitoring telephone conferences of claim 8 further including the step of displaying an indication of the presence of a quorum.

14. The method for monitoring telephone conferences of claim 12 further including the step of displaying a description of the attendee in association with each indicator representing an attendee.

15. A computer program having code recorded of a computer readable medium for monitoring telephone conferences in a communication network with user access via a plurality of data processor controlled interactive display stations for displaying received network documents available from sources on the network, said computer program comprising:
means enabling a requisite set of conference attendees respectively at a corresponding set of telephone stations to connect into a telephone conference;
an interactive display station associated with each of said set of telephone stations with a displayed document including:
an indicator representing each attendee having:
means for indicating whether the attendee's telephone station is connected into the conference, and
means for indicating whether the attendee is speaking;
means for placing on-call each telephone station initially connecting into the conference; and
means for calling said on-call telephone stations into the conference when a quorum of said requisite attendees has connected into the conference.

16. The computer program for monitoring telephone conferences of claim 15 wherein said conference initiating means further includes:
means for determining when said quorum has connected into the conference; and
wherein said means for calling said on-call telephone stations are automatically responsive to said means for determining when said quorum has connected.

17. The computer program for monitoring telephone conferences of claim 15 wherein said means for indicating become highlighted when the attendee's telephone station is connected.

18. The computer program for monitoring telephone conferences of claim 17 wherein said means for indicating pulse when the associated attendee is speaking.

19. The computer program for monitoring telephone conferences of claim 15 wherein:
said means for indicating whether the attendee's telephone station is connected become highlighted when the attendee's telephone station is connected; and
said means for indicating whether the attendee is speaking pulse when the associated attendee is speaking.

20. The computer program for monitoring telephone conferences of claim 15 further including display means for indicating the presence of a quorum.

21. The computer program for monitoring telephone conferences of claim 17 further including means associated with each indicator representing an attendee for describing said attendee.

* * * * *